(12) United States Patent
Resch et al.

(10) Patent No.: US 9,317,561 B2
(45) Date of Patent: Apr. 19, 2016

(54) SCENE CHANGE DETECTION AROUND A SET OF SEED POINTS IN MEDIA DATA

(75) Inventors: Barbara Resch, Solna (SE); Regunathan Radhakrishnan, Foster City, CA (US); Arijit Biswas, Nuremberg (DE); Jonas Engdegard, Stockholm (SE)

(73) Assignees: Dolby Laboratories Licensing Corporation, San Francisco, CA (US); Dolby International AB, Amsterdam, Zuidoost (NL)

(*) Notice: Subject to any disclaimer, the term of this patent is extended or adjusted under 35 U.S.C. 154(b) by 242 days.

(21) Appl. No.: 13/997,860

(22) PCT Filed: Dec. 15, 2011

(86) PCT No.: PCT/US2011/065086
§ 371 (c)(1),
(2), (4) Date: Jun. 25, 2013

(87) PCT Pub. No.: WO2012/091936
PCT Pub. Date: Jul. 5, 2012

(65) Prior Publication Data
US 2013/0287214 A1 Oct. 31, 2013

Related U.S. Application Data

(60) Provisional application No. 61/428,578, filed on Dec. 30, 2010, provisional application No. 61/428,588, filed on Dec. 30, 2010, provisional application No. 61/428,554, filed on Dec. 30, 2010, provisional application No. 61/569,591, filed on Dec. 12, 2011.

(51) Int. Cl.
*G06F 17/00* (2006.01)
*G06F 17/30* (2006.01)
(Continued)

(52) U.S. Cl.
CPC ............ *G06F 17/3053* (2013.01); *G06F 17/00* (2013.01); *G10H 1/0008* (2013.01); *G10L 25/48* (2013.01); *H04R 29/00* (2013.01); *G10H 2210/061* (2013.01); *G10H 2240/151* (2013.01)

(58) Field of Classification Search
CPC ................. G10H 2210/031; G10H 2210/036; G10H 2210/041; G10H 2210/046; G10H 2210/051; G10H 2210/056; G10H 2210/061; G10H 2210/066; G10H 2210/071; G10H 2210/076; G10H 2210/081; G10H 2210/086; G06F 17/3074; G06F 17/30743
See application file for complete search history.

(56) References Cited

U.S. PATENT DOCUMENTS

| 4,739,398 A | 4/1988 | Thomas |
| 6,185,527 B1 | 2/2001 | Petkovic |

(Continued)

FOREIGN PATENT DOCUMENTS

| CN | 101159834 | 4/2008 |
| EP | 1947638 | 7/2008 |

(Continued)

OTHER PUBLICATIONS

Sheh, A. et al "Chord Segmentation and Recognition Using EM-Trained Hidden Markov Models", Oct. 26, 2003, ISMIR 2003 Conference Proceedings.
(Continued)

*Primary Examiner* — Andrew C Flanders

(57) ABSTRACT

Techniques for scene change detection around seed points in media data are provided. Media features of many different types may be extracted from the media data. One or more statistical patterns of media features in a plurality of time-wise intervals around a plurality of seed time points of the media data may be determined using one or more types of features extractable from the media data. At least one of the one or more types of features comprises a type of features that captures structural properties, tonality including harmony and melody, timbre, rhythm, loudness, stereo mix, or a quantity of sound sources as related to the media data. A plurality of beginning scene change points and a plurality of ending scene change points in the media data may be detected, based on the one or more statistical patterns, for the plurality of seed time points in the media data.

20 Claims, 13 Drawing Sheets

(51) Int. Cl.
  *G10H 1/00* (2006.01)
  *H04R 29/00* (2006.01)
  *G10L 25/48* (2013.01)

(56) References Cited

U.S. PATENT DOCUMENTS

| | | | |
|---|---|---|---|
| 6,366,296 | B1 | 4/2002 | Boreczky |
| 7,024,033 | B2 | 4/2006 | Li |
| 7,065,544 | B2 | 6/2006 | Moreno |
| 7,179,982 | B2 | 2/2007 | Goto |
| 7,333,864 | B1 | 2/2008 | Herley |
| 7,379,875 | B2 | 5/2008 | Burges |
| 7,409,407 | B2 | 8/2008 | Radhakrishnan |
| 7,831,531 | B1 | 11/2010 | Baluja |
| 7,991,770 | B2 | 8/2011 | Covell et al. |
| 8,259,806 | B2 | 9/2012 | Radhakrishnan et al. |
| 8,266,142 | B2 | 9/2012 | Jiang |
| 8,351,643 | B2 | 1/2013 | Radhakrishnan et al. |
| 8,688,248 | B2 | 4/2014 | Wang |
| 8,700,641 | B2 | 4/2014 | Covell et al. |
| 2002/0028021 | A1 | 3/2002 | Foote |
| 2002/0083060 | A1 | 6/2002 | Wang |
| 2003/0101144 | A1 | 5/2003 | Moreno |
| 2003/0120652 | A1 | 6/2003 | Tifft |
| 2003/0183064 | A1 | 10/2003 | Eugene et al. |
| 2004/0002973 | A1 | 1/2004 | Chaudhuri |
| 2005/0044561 | A1 | 2/2005 | McDonald |
| 2005/0065976 | A1 | 3/2005 | Holm |
| 2005/0091062 | A1 | 4/2005 | Burges |
| 2006/0065102 | A1 | 3/2006 | Xu |
| 2006/0080356 | A1 | 4/2006 | Burges |
| 2006/0212704 | A1 | 9/2006 | Kirovski |
| 2006/0251321 | A1 | 11/2006 | Kryeziu |
| 2006/0276174 | A1 | 12/2006 | Katz |
| 2007/0058949 | A1 | 3/2007 | Hamzy |
| 2007/0192087 | A1 | 8/2007 | Kim |
| 2007/0294295 | A1 | 12/2007 | Finkelstein |
| 2008/0004878 | A1 | 1/2008 | Weng |
| 2008/0104246 | A1 | 5/2008 | Katz |
| 2008/0190267 | A1 | 8/2008 | Rechsteiner et al. |
| 2008/0221895 | A1 | 9/2008 | Pauws et al. |
| 2008/0236371 | A1 | 10/2008 | Eronen |
| 2009/0005890 | A1 | 1/2009 | Zhang |
| 2009/0049979 | A1 | 2/2009 | Naik et al. |
| 2009/0132077 | A1* | 5/2009 | Fujihara et al. ............ 700/94 |
| 2009/0210078 | A1 | 8/2009 | Crowley |
| 2009/0228799 | A1* | 9/2009 | Verbeeck et al. ........... 715/727 |
| 2009/0257649 | A1 | 10/2009 | Yamauchi |
| 2009/0277322 | A1 | 11/2009 | Cai |
| 2009/0287323 | A1* | 11/2009 | Kobayashi ............ 700/94 |
| 2009/0287620 | A1 | 11/2009 | Xu |
| 2010/0172591 | A1 | 7/2010 | Ishikawa |
| 2010/0205174 | A1 | 8/2010 | Jiang et al. |
| 2011/0000359 | A1* | 1/2011 | Yoshida et al. ............ 84/601 |
| 2011/0052139 | A1 | 3/2011 | Oku |
| 2011/0112672 | A1* | 5/2011 | Brown et al. ............ 700/94 |
| 2011/0126103 | A1* | 5/2011 | Cohen et al. ............ 715/716 |
| 2011/0188704 | A1 | 8/2011 | Radhakrishnan et al. |
| 2011/0264649 | A1 | 10/2011 | Hsiao et al. |
| 2011/0268284 | A1 | 11/2011 | Arimoto et al. |
| 2011/0268315 | A1 | 11/2011 | Bauer et al. |
| 2012/0029670 | A1 | 2/2012 | Mont-Reynaud |
| 2012/0078894 | A1 | 3/2012 | Jiang et al. |
| 2012/0095958 | A1 | 4/2012 | Pereira |
| 2013/0131851 | A1 | 5/2013 | Ullrich et al. |
| 2013/0177066 | A1 | 7/2013 | Ye |
| 2013/0289756 | A1 | 10/2013 | Resch et al. |

FOREIGN PATENT DOCUMENTS

| | | |
|---|---|---|
| EP | 2093753 | 8/2009 |
| KR | 10-0766170 | 10/2007 |
| WO | 2012/091935 | 7/2012 |
| WO | 2012/091938 | 7/2012 |
| WO | WO 2012/091936 | 7/2012 |

OTHER PUBLICATIONS

Ong, Bee Suan "Structural Analysis and Segmentation of Music Signals" Jan. 1, 2007, p. 23-24, p. 41-66.

Goto, Masataka, "A Chorus Section Detection Method for Musical Audio Signals and Its Application to a Music Listening Station" IEEE Transactions on Audio, Speech and Language Processing, New York, USA, vol. 14, No. 5, Sep. 1, 2006.

Bergstra, J. et al. "Aggregate Features and Adaboost for Music Classification", Kluwer Academic Publishers—Plenum Publishers, vol. 65, No. 2-3, Jun. 30, 2006, pp. 473-484.

Bartsch, M.A. et al. "Audio Thumbnailing of Popular Music Using Chroma-Based Representations" IEEE Transactions on Multimedia, vol. 7, No. 1, pp. 96-104, published on Feb. 2005.

Tian, A. et al. "Histogram Matching for Music Repetition Detection" Proc. 2009 IEEE International Conference on Multimedia and Expo, Jun. 28-Jul. 3, 2009.

Bartsch, M.A. et al. "To Catch A Chorus: Using Chroma-Based Representations for Audio Thumbnailing" Proc. of the 2001 IEEE Workshop on the Applications of Signal Processing to Audio and Acoustics, Oct. 21-24, 2001, pp. 15-18.

Chai, Wei, "Semantic Segmentation and Summarization of Music: Methods Based on Tonality and Recurrent Structure" IEEE Signal Processing Magazine, vol. 23, No. 2, pp. 124-132, published on Mar. 2006.

Wang, M. et al. "Repeating Pattern Discovery from Acoustic Musical Signals" IEEE International Conference on Multimedia and Expo, published on Dec. 1, 2004.

Peeters, Geoffrey, Deriving Musical Structures from Signal Analysis for Music Audio Summary Generation: "sequence" and "state" approach, Computer Music Modeling and Retrieval. International Symposium. pp. 143-166, vol. 2771, 2004.

Schuller, B. et al. "Music Thumbnailing Incorporating Harmony and Rhythm Structure" 6th International Workshop on Adaptive Multimedia Retrieval, published by Springer Verlag on Aug. 2010.

Dannenberg, R.B. et al. "Pattern Discovery Techniques for Music Audio" Journal of New Music Research, vol. 32, No. 2, pp. 153-163, published in Netherlands in Jun. 2003.

Graves, D. et al. "Structural Segmentation of Music with Fuzzy Clustering" Canadian Acoustics, published by Canadian Acoustical Association on Sep. 1, 2008.

Li, X. et al. "A Review on Objective Music Structure Analysis" Proc. of the 2009 International Conference on Information and Multimedia Technology.

Jieping, X. et al. "Music Snippet Extraction via Melody-Based Repeated Pattern Discovery" vol. 52, No. 5, pp. 804-812, published in Germany in May 2009.

Chai, Wei "Structural Analysis of Musical Signals via Pattern Matching" IEEE International Conference on Acoustics, Speech and Signal Processing, 2003.

Koh, Jia-Ling, et al. "Efficient Feature Mining in Music Objects" published by Springer-Verlag, Berlin in Sep. 2001.

Stein, M. et al. "Evaluation and Comparison of Audio Chroma Feature Extraction Methods" AES Convention, May 2009.

Kelly, C. et al. "Structural Segmentation of Irish Traditional Music Using Chroma at Set Accented Tone Locations" AES Convention Oct. 2009.

Harte, C. et al. "Automatic Chord Identification Using a Quantised Chromagram" AES Convention May 2005.

U.S. Appl. No. 13/997,866, Non-Final Office Action dated Sep. 25, 2014.

U.S. Appl. No. 13/997,866, Final Office Action dated Jan. 12, 2015.

U.S. Appl. No. 13/997,866, Non-Final Office Action dated Jun. 5, 2015.

U.S. Appl. No. 13/995,780, Non-Final Office Action dated Jun. 5, 2015.

Perceptual Coding: How Mp3 Compression Works.

United States Patent and Trademark Office, U.S. Appl. No. 13/997,866, Notice of Allowance dated Nov. 2, 2015.

United States Patent and Trademark Office, U.S. Appl. No. 13/997,866, Notice of Allowance dated Jan. 7, 2016.

* cited by examiner

SCENE CHANGE DETECTION AROUND A SET OF SEED POINTS IN MEDIA DATA

CROSS-REFERENCE TO RELATED APPLICATIONS

This application claims priority to U.S. Patent Provisional Application Nos. 61/428,578, filed 30 Dec. 2010, 61/428,588, filed 30 Dec. 2010, and 61/428,554, filed 30 Dec. 2010, and 61/569,591, filed 12 Dec. 2011, hereby incorporated by reference in each entireties.

TECHNOLOGY

The present invention relates generally to media, and in particular, to detecting scene changes in media data.

BACKGROUND

Media data may comprise representative segments that are capable of making lasting impressions on listeners or viewers. For example, most popular songs follow a specific structure that alternates between a verse section and a chorus section. Usually, the chorus section is the most repeating section in a song and also the "catchy" part of a song. The position of chorus sections typically relates to the underlying song structure, and may be used to facilitate an end-user to browse a song collection.

Thus, on the encoding side, the position of a representative segment such as a chorus section may be identified in media data such as a song, and may be associated with the encoded bitstream of the song as metadata. On the decoding side, the metadata enables the end-user to start the playback at the position of the chorus section. When a collection of media data such as a song collection at a store is being browsed, chorus playback facilitates instant recognition and identification of known songs and fast assessment of liking or disliking for unknown songs in a song collection.

In a "clustering approach" (or a state approach), a song may be segmented into different sections using clustering techniques. The underlying assumption is that the different sections (such as verse, chorus, etc.) of a song share certain properties that discriminate one section from the other sections or other parts of the song.

In a "pattern matching approach" (or a sequence approach), it is assumed that a chorus is a repetitive section in a song. Repetitive sections may be identified by matching different sections of the song with one another.

Both "the clustering approach" and "the pattern matching approach" require computing a distance matrix from an input audio clip. In order to do so, the input audio clip is divided into N frames; features are extracted from each of the frames. Then, a distance is computed between every pair of frames among the total number of pairs formed between any two of the N frames of the input audio clip. The derivation of this matrix is computationally expensive and requires high memory usage, because a distance needs to be computed for each and every one of all the combinations (which means an order of magnitude of N×N times, where N is the number of frames in a song or an input audio clip therein).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1:
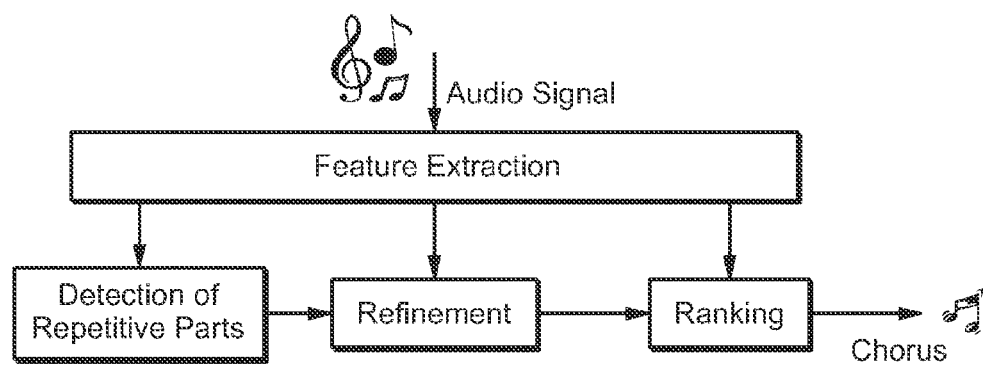
FIG. 1 depicts an example basic block diagram of a media processing system, according to possible embodiments of the present invention.

Example possible embodiments, which relate to detecting scene changes in media data, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily including, obscuring, or obfuscating the present invention.

Example embodiments are described herein according to the following outline:

1. GENERAL OVERVIEW
2. FRAMEWORK FOR FEATURE EXTRACTION
3. SPECTRUM BASED FINGERPRINTS
4. CHROMA FEATURES
5. OTHER FEATURES
    5.1 MEL-FREQUENCY CEPSTRAL COEFFICIENTS (MFCC)
    5.2 RHYTHM FEATURES
6. DETECTION OF REPETITIVE PARTS
7. REFINEMENT USING SCENE CHANGE DETECTION
8. RANKING
9. OTHER APPLICATIONS
10. EXAMPLE PROCESS FLOW
11. IMPLEMENTATION MECHANISMS—HARDWARE OVERVIEW
12. EQUIVALENTS, EXTENSIONS, ALTERNATIVES AND MISCELLANEOUS

1. GENERAL OVERVIEW

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

As described herein, media data may comprise, but are not limited to, one or more of: songs, music compositions, scores, recordings, poems, audiovisual works, movies, or multimedia presentations. In various embodiment, the media data may be derived from one or more of: audio files, media database records, network streaming applications, media applets, media applications, media data bitstreams, media data containers, over-the-air broadcast media signals, storage media, cable signals, or satellite signals.

Media features of many different types may be extractable from the media data, capturing structural properties, tonality including harmony and melody, timbre, rhythm, loudness, stereo mix, or a quantity of sound sources of the media data. Features extractable from media data as described herein may relate to any of a multitude of media standards, a tuning system of 12 equal temperaments or a different tuning system other than a tuning system of 12 equal temperaments.

One or more of these types of media features may be used to generate a digital representation for the media data. For example, media features of a type that captures tonality, timbre, or both tonality and timbre of the media data may be extracted, and used to generate a full digital representation, for example, in time domain or frequency domain, for the media data. The full digital representation may comprise a total of N frames. Examples of a digital representation may include, but are not limited to, those of fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

Under some techniques, an N×N distance matrix may be calculated to determine whether, and wherein in the media data, a particular segment with certain representative characteristics exists in the media data. Examples of representative characteristics may include, but are not limited to, certain media features such as absence or presence of voice, repetition characteristics such as the most repeated or least repeated, etc.

In sharp contrast, under techniques as described herein, the digital representation may be reduced to fingerprints first. As used herein, fingerprints may be of a data volume several magnitudes smaller than that of the digital representation from which the fingerprints were derived and may be efficiently computed, searched, and compared.

In some possible embodiments, the feature-based comparisons or distance computations may be performed between features at a time difference equal to the significant offset values only. The whole distance matrix using N frames that cover the entire time duration of the media data as required in the existing techniques may be avoided under techniques as described herein.

In some possible embodiments, the feature-based comparisons or distance computations between features with time difference equal to the significant offset values as described herein may be based on a type of feature that is the same as the type that is used to generate the previously mentioned fingerprints. Alternatively and/or optionally, these feature-based comparisons or distance computations may be based on a type of feature that is NOT the same as the type of feature that was used to generate the previously mentioned fingerprints.

In some possible embodiments, the feature-based comparisons or distance computations between features with time difference equal to the significant offset values as described herein may produce similarity or dissimilarity values relating to one or more of Euclidean distances of vectors, mean squared errors, bit error rates, auto-correlation based measures, or Hamming distances. In some possible embodiments, filters may be applied to smooth the similarity or dissimilarity values. Examples of such filters may be, but are not limited to, a lowpass filter, such as Butterworth filter, moving average filter, etc.

In some possible embodiments, the filtered similarity or dissimilarity values may be used to identify a set of seed time points for each of the significant offset values. A seed time point, for example, may correspond to a local minimum or maximum in the filtered values.

In some possible embodiments, feature-based statistical patterns around the seed time points may be probed to determine whether there are discontinuities or changes which may indicate boundary points for neighboring media segments of contrasting and distinct media characteristics.

The feature-based statistical patterns to be probed may be generated based on one or more types of media features extractable from the media data. Under techniques as described herein, a beginning scene change point to the left of a seed time point and an ending scene change point to the right of the same seed time point may be detected based on the feature-based statistical patterns.

In some possible embodiments, a model selection criterion may be applied to the feature-based statistical patterns for the purpose of detecting scene changes in the media data. For example, the feature-based statistical patterns may reveal a discontinuity of statistical parameters from the right side of a time point to the left side of the time point. Thus, the time point may be determined as a scene change point. A model selection criterion as described herein may relate to one or more of Gaussian statistical models, or non-Gaussian General statistical models.

Under techniques as described herein, a pair of a beginning scene change point and an ending scene change point for a seed time point may delimit a candidate representative segment, of the media data, with the representative characteristics. The candidate representative segment may constitute a unique section of the media data. Alternatively and/or optionally, the candidate representative segment may constitute a chorus segment. Alternatively and/or optionally, the candidate representative segment may constitute a highly repetitive segment, an intermediately repeated segment, or an infrequently repeated segment, etc. Under the techniques as described herein, the candidate representative segments with certain representative characteristics may be identified through scene change detection as described herein.

Benefits of the present invention include, but are not limited to, identifying a representative segment (e.g., a chorus section or a brief section that may be suitable for replaying or previewing when a large section of songs is being browsed, a ring tone, etc.). To play any of one or more representative segments in media data such as a song, the locations of one or more representative segments in the media, for example, may be encoded by a media generator in a media data bitstream in the encoding stage. The media data bitstream may then be decoded by a media data player to recover the locations of the representative segments and to play any of the representative segments.

In some possible embodiments, mechanisms as described herein form a part of a media processing system, including but not limited to: a handheld device, game machine, television, laptop computer, netbook computer, cellular radiotelephone, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. FRAMEWORK FOR FEATURE EXTRACTION

In some possible embodiments, a media processing system herein may contain four major components as shown in FIG. 1. A feature-extraction component may extract features of various types from media data such as a song. A repetition detection component may find time-wise sections of the media data that are repetitive, for example, based on certain characteristics of the media data such as the melody, harmonies, lyrics, timbre of the song in these sections as represented in the extracted features of the media data.

In some possible embodiments, the repetitive segments may be subjected to a refinement procedure performed by a scene change detection component, which finds the correct start and end time points that delineate segments encompassing selected repetitive sections. These correct start and end time points may comprise beginning and ending scene change points of one or more scenes possessing distinct characteristics in the media data. A pair of a beginning scene change point and an ending scene change point may delineate a candidate representative segment.

A ranking algorithm performed by a ranking component may be applied for the purpose of selecting a representative segment from all the candidate representative segments. In a particular embodiment, the representative segment selected may be the chorus of the song.

In some possible embodiments, a media processing system as described herein may be configured to perform a combination of fingerprint matching and chroma distance analyses. Under the techniques as described herein, the system may operate with high performance at a relatively low complexity to process a large amount of media data. The fingerprint matching enables fast and low-complexity searches for the best matching segments that are repetitive in the media data. In these embodiments, a set of offset values at which repetitions occur is identified. Then, a more accurate chroma distance analysis is applied only at those offsets. Relative to a same time interval of the media data, the chroma distance analysis may be more reliable and accurate than the fingerprint matching analysis but at the expense of higher complexity than that of the fingerprint matching analysis. The advantage of the combined/hybrid approach is that since the chroma distance analysis is only applied to certain offsets in the media data, the computational complexity and memory usage decreases drastically as compared with applying the chroma distance analysis on the whole time duration of the media data.

Figure 2:
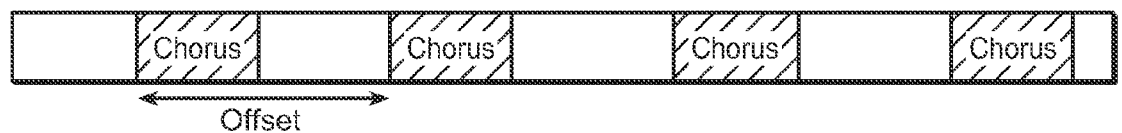
FIG. 2 depicts example media data such as a song having an offset between chorus sections, according to possible embodiments of the present invention.
Figure 3:
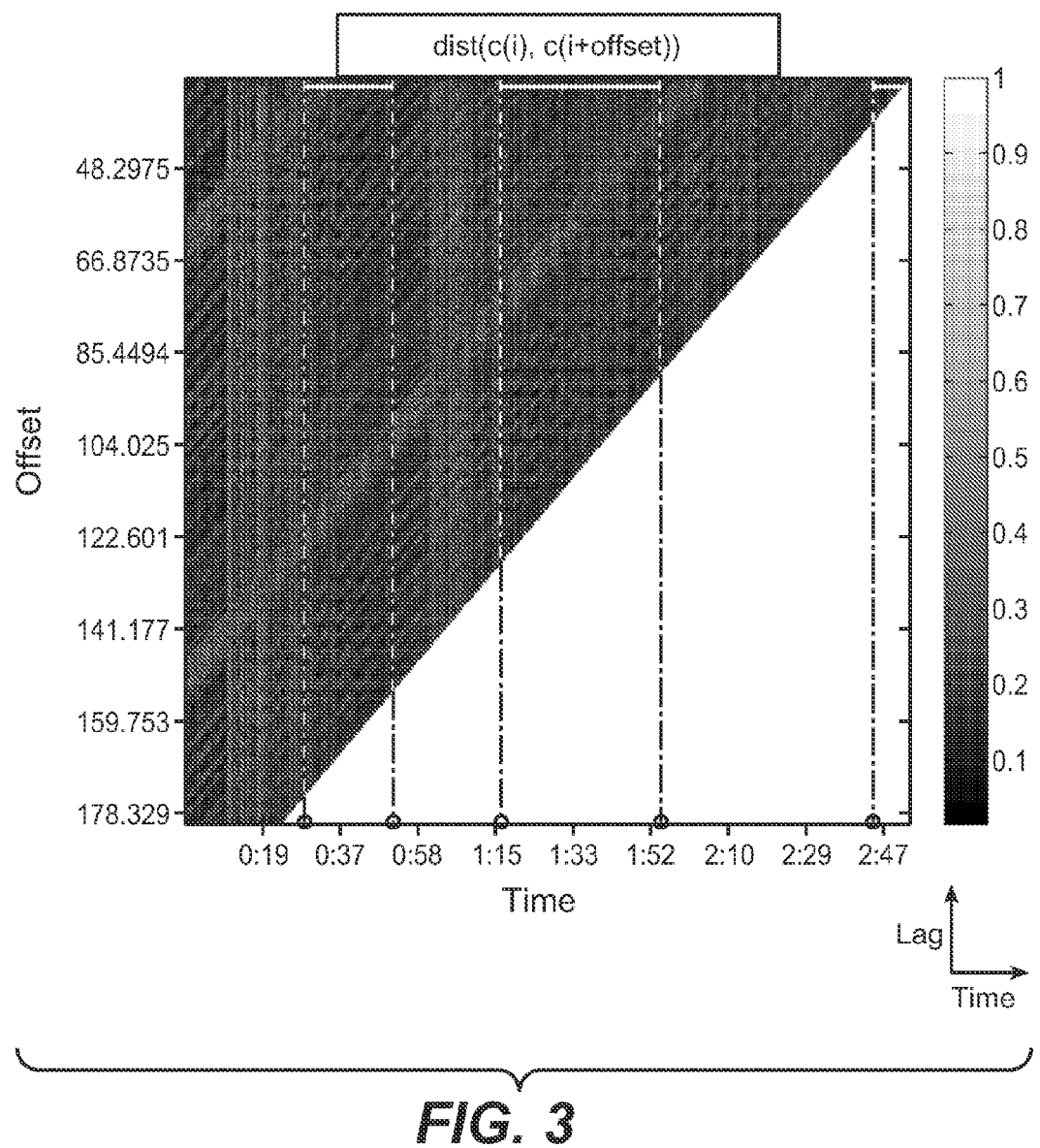
FIG. 3 illustrates an example distance matrix, in accordance with possible embodiments of the present invention.

As mentioned, some repetition detection systems compute a full distance matrix, which contains the distance between each and every one of all combinations formed by any two of all N frames of media data. The computation of the full distance matrix may be computationally expensive and require high memory usage. FIG. 2 depicts example media data such as a song having an offset as shown between the first and second chorus sections. FIG. 3 shows an example distance matrix with two dimensions, time and offset, for distance computation. The offset denotes the time-lag between two frames from which a dissimilarity value (or a distance) relating to a features (or similarity) is computed. Repetitive sections are represented as horizontal dark lines, corresponding to a low distance of a section of successive frames to another section of successive frames that are a certain offset apart.

Under techniques as described herein, the computation of a full distance matrix may be avoided. Instead, fingerprint matching data may be analyzed to provide the approximate locations of repetitions and respective offsets between (neighboring repetitions) approximate locations. Thus, distance computations between features that are separated by an offset value that is not equal to one of the significant offsets can be avoided. In some possible embodiment, the feature comparison at the significant offset values may further be performed on a restricted time range comprising time positions of time points (tm and tq) from fingerprint analysis. As a result, even if a distance matrix is used under techniques as described herein, such a distance matrix may comprise only a few rows and columns for which distances are to be computed, relative to the full distance matrix under other techniques.

3. SPECTRUM BASED FINGERPRINTS

The goal of fingerprint extraction is to create a compact bitstream representation that can serve as an identifier for an underlying section of the media data. In general, for the purpose of detecting malicious tempering of media data, fingerprints may be designed in such a way as to possess robustness against a variety of signal processing/manipulation operations including coding, Dynamic Range Compression (DRC), equalization, etc. However, for the purpose of finding repeating sections in media data as described herein, the robustness requirements of fingerprints may be relaxed, since the matching of the fingerprints occurs within the same song. Malicious attacks that must be dealt with by a typical fingerprinting system may be absent or relatively rare in the media data as described herein.

Furthermore, fingerprint extraction herein may be based on a coarse spectrogram representation. For example, in embodiments in which the media data is an audio signal, the audio signal may be down-mixed to a mono signal and may additionally and/or optionally be down sampled to 16 kHz. In some embodiments, the media data such as the audio signal may be processed into, but is not limited to, a mono signal, and may further be divided into overlapping chunks. A spectrogram may be created from each of the overlapping chunks. A coarse spectrogram may be created by averaging along both time and frequency. The foregoing operation may provide robustness against relatively small changes in the spectrogram along time and frequency. It should be noted that, in some possible embodiments, the coarse spectrogram herein may also be chosen in a way to emphasize certain parts of a spectrum more than other parts of the spectrum.

Figure 4:
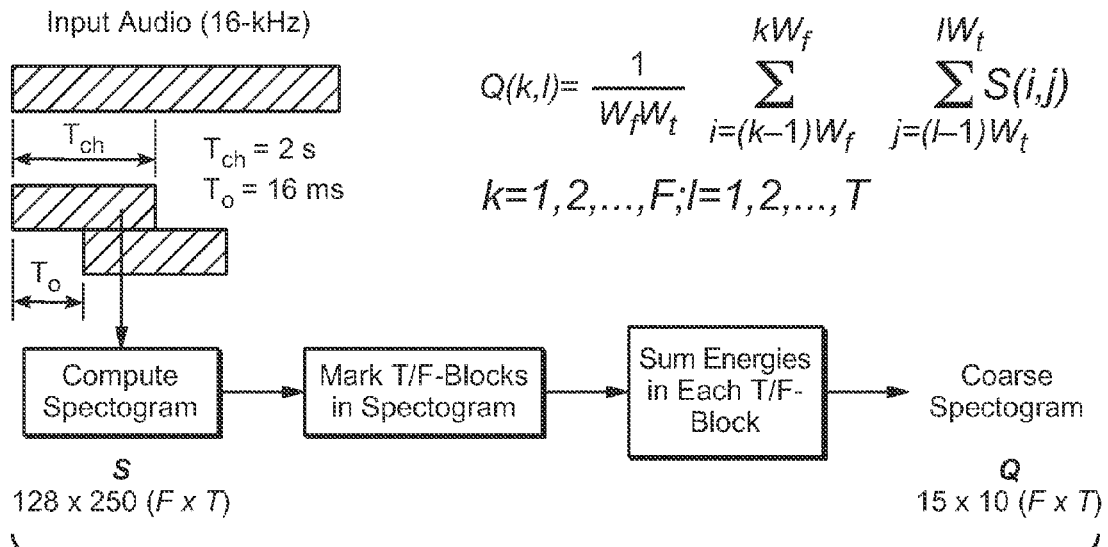
FIG. 4 illustrates example generation of a coarse spectrogram, according to possible embodiments of the present invention.

FIG. 4 illustrates example generation of a coarse spectrogram according to possible embodiments of the present invention. The (input) media data (e.g., a song) is first divided into chunks of duration $T_{ch}=2$ seconds with a step size of $T_o=16$ ms. For each chunk of audio data ($X_{ch}$), a spectrogram may be computed with a certain time resolution (e.g., 128 samples or 8 ms) and frequency resolution (256-sample FFT). The computed spectrogram S may be tiled with time-frequency blocks. The magnitude of the spectrum within each of the time-frequency blocks may be averaged to obtain a coarse representation Q of the spectrogram S. The coarse representation Q of S may be obtained by averaging the magnitude of frequency coefficients in time-frequency blocks of size $W_f \times W_t$. Here, $W_f$ is the size of block along frequency and $W_t$ is the size of block along time. Let F be the number of blocks along frequency axis and T be the number of blocks along time axis and hence Q is of size (F*T). Q may be computed in expression (1) given below:

$$Q(k, l) = \frac{1}{W_f * W_t} \sum_{i=(k-1)W_f}^{kW_f} \sum_{j=(l-1)W_t}^{lW_t} S(i, j)$$

$$k = 1, 2 \ldots F; l = 1, 2 \ldots T$$

Here, i and j represent the indices of frequency and time in the spectrogram and k and l represent the indices of the time-frequency blocks in which the averaging operation is performed. In some possible embodiments, F may be a positive integer (e.g., 5, 10, 15, 20, etc.), while T may be a positive integer (e.g., 5, 10, 15, 20, etc.).

In some possible embodiments, a low-dimensional representation of the coarse representation (Q) of spectrogram of the chunk may be created by projecting the spectrogram onto pseudo-random vectors. The pseudo-random vectors may be thought of as basis vectors. A number K of pseudo-random vectors may be generated, each of which may be with the same dimensions as the matrix Q (F×T). The matrix entries may be uniformly distributed random variables in [0, 1]. The state of the random number generator may be set based on a key. Let the pseudo-random vectors be denoted as $P_1, P_2, \ldots, P_K$, each of dimension (F×T). The mean of each matrix $P_i$ may be computed. Each matrix element in $P_i$ (i goes from 1 to K) may be subtracted with the mean of matrix $P_i$. Then, the matrix Q may be projected onto these K random vectors as shown below:

$$H_k = \sum_{i=1}^{M} \sum_{j=1}^{N} Q(i, j) * P_k(i, j)$$

Here $H_k$ is the projection of the matrix Q onto the random vector $P_k$. Using the median of these projections ($H_k$, k=1, 2, ... K) as a threshold, a number K of hash bits for the matrix Q may be generated. For example, a hash bit '1' may be generated for $k^{th}$ hash bit if the projection $H_k$ is greater than the threshold. Otherwise, a hash bit of '0' if not. In some possible embodiments, K may be a positive integer such as 8, 16, 24, 32, etc. In an example, a fingerprint of 24 hash bits as described herein may be created for every 16 ms of audio data. A sequence of fingerprints comprising these 24-bit codewords may be used as an identifier for that particular chunk of audio that the sequence of fingerprints represents. In a possible embodiment, the complexity of fingerprint extraction as described herein may be about 2.58 MIPS.

A coarse representation Q herein has been described as a matrix derived from FFT coefficients. It should be noted that this is for illustration purposes only. Other ways of obtaining a representation in various granularities may be used. For example, different representations derived from fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients, chroma features, or other approaches may be used to derive codewords, hash bits, fingerprints, and sequences of fingerprints for chunks of the media data.

4. CHROMA FEATURES

A chromagram may be defined as an n-dimensional chroma vector. For example, for media data in a tuning system of 12 equal temperaments, a chromagram may be defined as a 12-dimensional chroma vector in which each dimension corresponds to the intensity (or alternatively magnitude) of a semitone class (chroma). Different dimensionalities of chroma vectors may be defined for other tuning systems. The chromagram may be obtained by mapping and folding an audio spectrum into a single octave. The chroma vector represents a magnitude distribution over chromas that may be discretized into 12 pitch classes within an octave. Chroma vectors capture melodic and harmonic content of an audio signal and may be less sensitive to changes in timbre than the spectrograms as discussed above in connection with fingerprints that were used for determining repetitive or similar sections.

Figure 5:
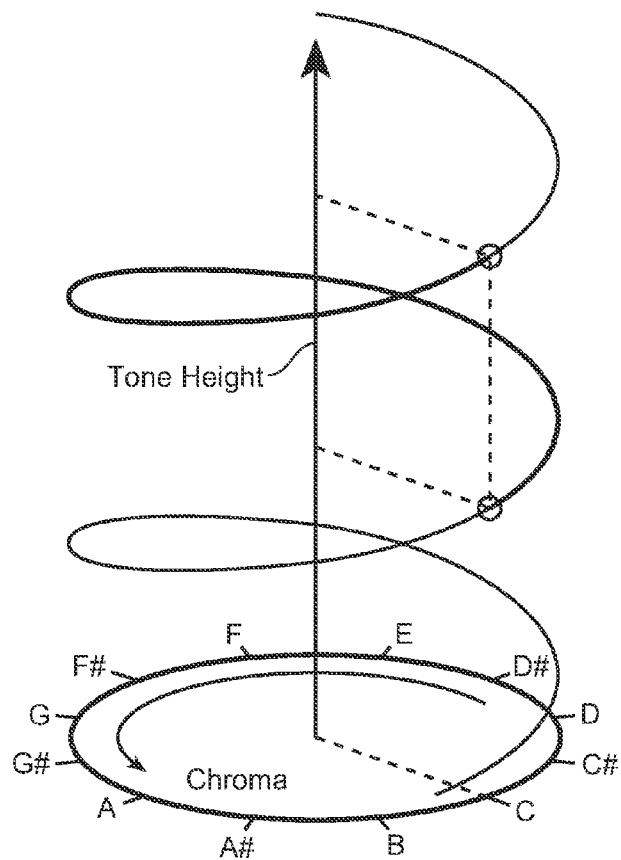
FIG. 5 illustrates an example helix of pitches, according to possible embodiments of the present invention.

Chroma features may be visualized by projecting or folding on a helix of pitches as illustrated in FIG. 5. The term "chroma" refers to the position of a musical pitch within a particular octave; the particular octave may correspond to a cycle of the helix of pitches, as viewed from sideways in FIG. 5. Essentially, a chroma refers to a position on the circumference of the helix as seen from directly above in FIG. 5, without regard to heights of octaves on the helix of FIG. 5. The term "height", on the other hand, refers to a vertical position on the circumference of the helix as seen from the side in FIG. 5. The vertical position as indicated by a specific height corresponds to a position in a specific octave of the specific height.

The presence of a musical note may be associated with the presence of a comb-like pattern in the frequency domain. This pattern may be composed of lobes approximately at the positions corresponding to the multiples of the fundamental frequency of an analyzed tone. These lobes are precisely the information which may be contained in the chroma vectors.

In some possible embodiments, the content of the magnitude spectrum at a specific chroma may be filtered out using a band-pass filter (BPF). The magnitude spectrum may be multiplied with a BPF (e.g., with a Hann window function). The center frequencies of the BPF as well as the width may be determined by the specific chroma and a number of height values. The window of the BPF may be centered at a Shepard's frequency as a function of both chroma and height. An independent variable in the magnitude spectrum may be frequency in Hz, which may be converted to cents (e.g., 100 cents equals to a half-tone). The fact that the width of the BPF is chroma specific stems from the fact that musical notes (or chromas as projected onto a particular octave of the helix of FIG. 5) are not linearly spaced in frequency, but logarithmically. Higher pitched notes (or chromas) are further apart from each other in the spectrum than lower pitched notes, so the frequency intervals between notes at higher octaves are wider than those at lower octaves. While the human ear is able to perceive very small differences in pitch at low frequencies, the human ear is only able to perceive relatively significant changes in pitch at high frequencies. For these reasons related to human perception, the BPF may be selected to be of a relatively wide window and of a relatively large magnitude at relatively high frequencies. Thus, in some possible embodiments, these BPF filters may be perceptually motivated.

A chromagram may be computed by a short-time-fourier-transformation (STFT) with a 4096-sample Hann window. In some possible embodiments, a fast-fourier-transform (FFT) may be used to perform the calculations; a FFT frame may be shifted by 1024 samples, while a discrete time step (e.g., 1 frame shift) may be 46.4 (or simply denoted as 46 herein) milliseconds (ms).

Figure 6:
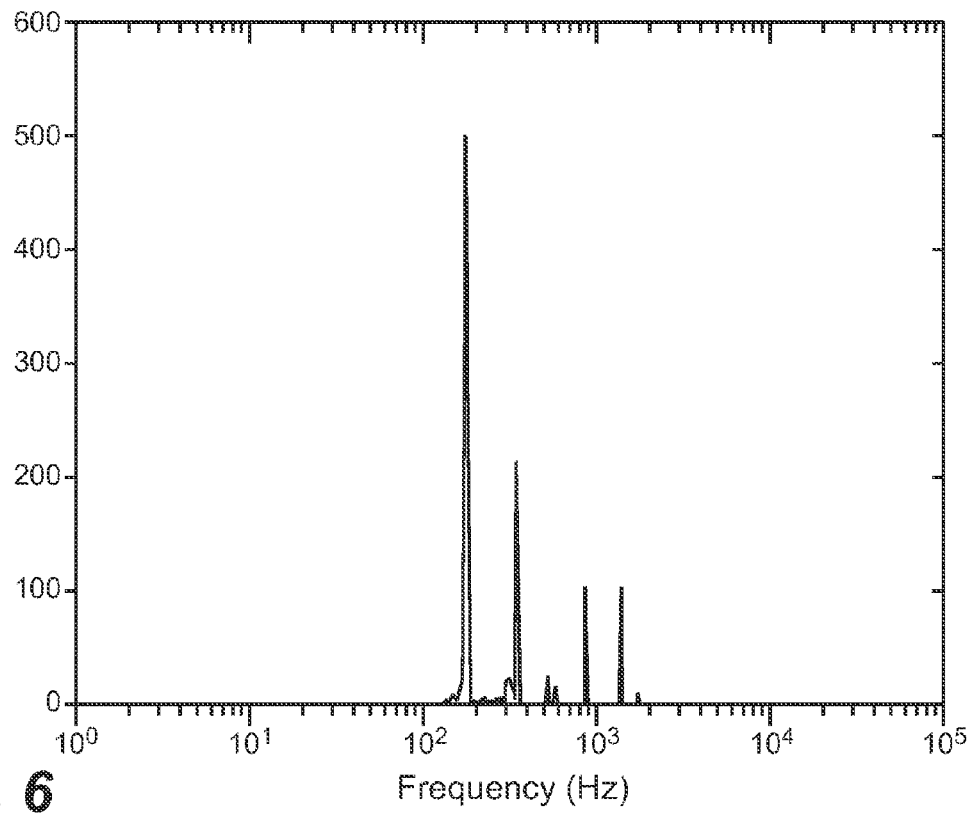
FIG. 6 illustrates an example frequency spectrum, according to possible embodiments of the present invention.
Figure 7:
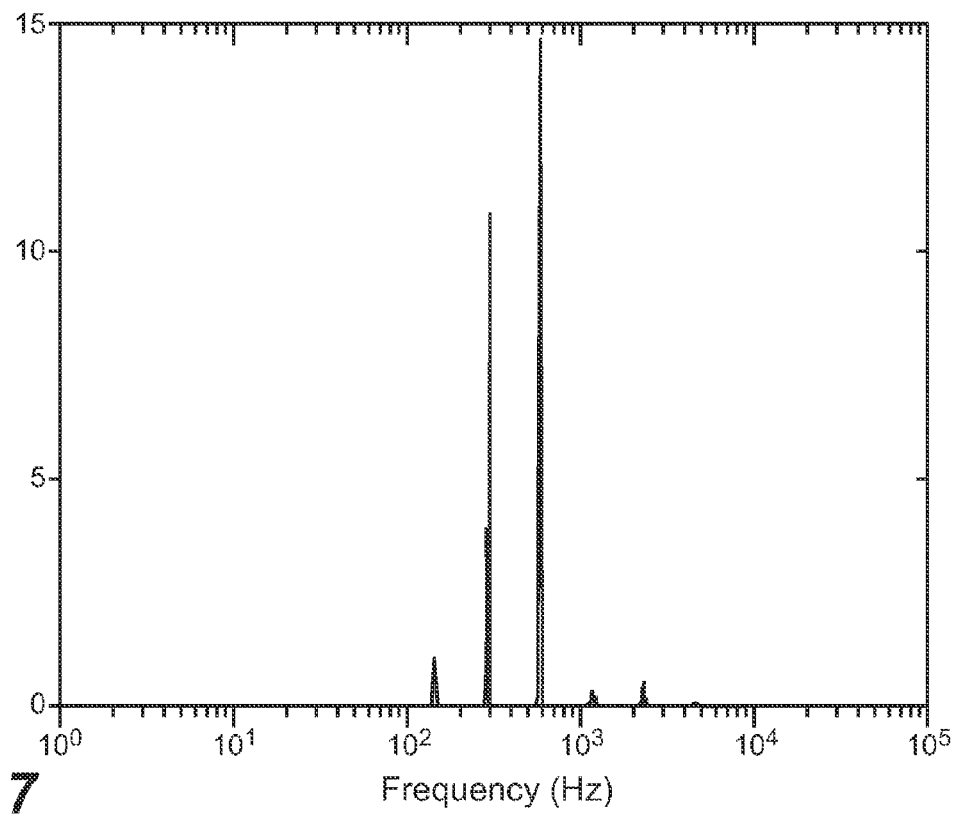
FIG. 7 illustrates an example comb pattern to extract an example chroma, according to possible embodiments of the present invention.

First, the frequency spectrum (as illustrated in FIG. 6) of a 46 ms frame may be computed. Second, the presence of a musical note may be associated with a comb pattern in the frequency spectrum, composed of lobes located at the positions of the various octaves of the given note. The comb pattern may be used to extract, e.g., a chroma D as shown in FIG. 7. The peaks of the comb pattern may be at 147, 294, 588, 1175, 2350, and 4699 Hz.

Figure 8:
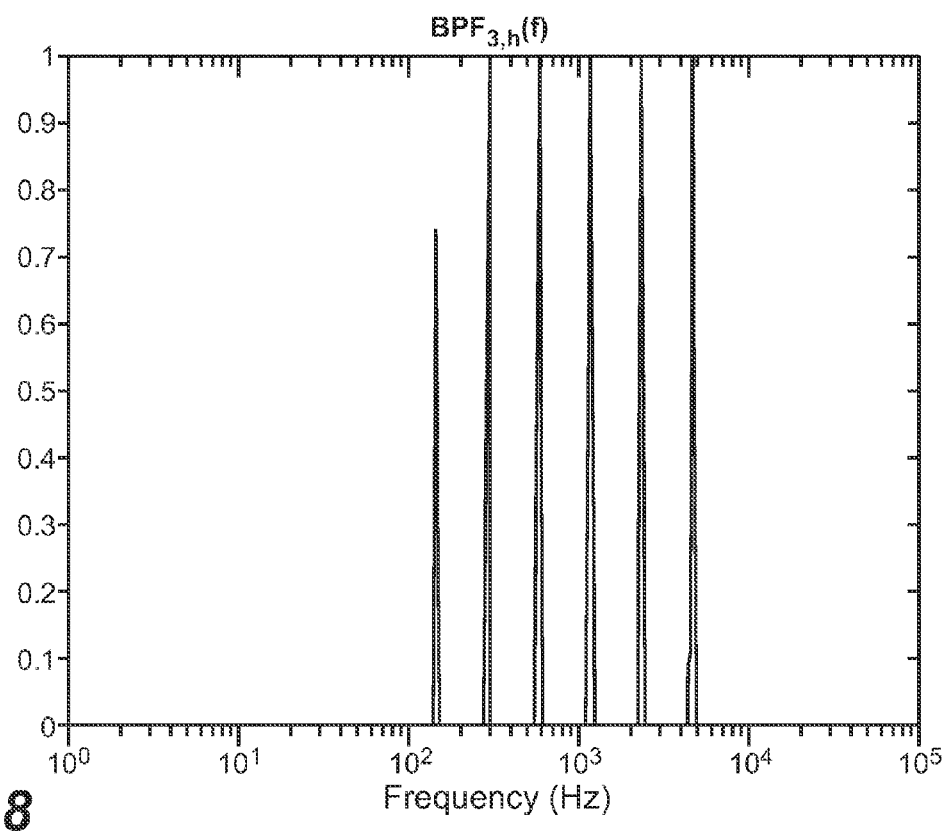
FIG. 8 illustrates an example operation to multiply a frame's spectrum with a comb pattern, according to possible embodiments of the present invention.

Third, to extract the chroma D from a given frame of a song, the frame's spectrum may be multiplied with the above comb pattern. The result of the multiplication is illustrated in FIG. 8, and represents all the spectral content needed for the calculation of the chroma D in the chroma vector of this frame. The magnitude of this element is then simply a summation of the spectrum along the frequency axis.

Fourth, to calculate the remaining 11 chromas the system herein may generate the appropriate comb patterns for each of the chromas, and the same process is repeated on the original spectrum.

In some possible embodiments, a chromagram may be computed using Gaussian weighting (on a log-frequency axis; which may, but is not limited to, be normalized). The Gaussian weighting may be centered at a log-frequency point, denoted as a center frequency "f_ctr", on the log-frequency axis. The center frequency "f_ctr" may be set to a value of ctroct (in units of octaves or cents/1200, with the referential origin at A0), which corresponds to a frequency of 27.5* (2^ctroct) in units of Hz. The Gaussian weighting may be set with a Gaussian half-width of f_sd, which may be set to a value of octwidth in units of octaves. For example, the magnitude of the Gaussian weighting drops to exp(−0.5) at a factor of 2^octwidth above and below the center frequency f_ctr. In other words, in some possible embodiments, instead of using individual perceptually motivated BPFs as previously described, a single Gaussian weighting filter may be used.

Thus, for ctroct=5.0 and octwidth=1.0, the peak of the Gaussian weighting is at 880 Hz, and the weighting falls to approximately 0.6 at 440 Hz and 1760 Hz. In various possible embodiments, the parameters of the Gaussian weighting may be preset, and additionally and/or optionally, configurable by a user manually and/or by a system automatically. In some possible embodiments, a default setting of ctroct=5.1844 (which gives f_ctr=1000 Hz) and octwidth=1 may be present or configured. Thus, the peak of the Gaussian weighting for this example default setting is at 1000 Hz, and the weighting falls to approximately 0.6 at 500 and 2000 Hz.

Figure 9:
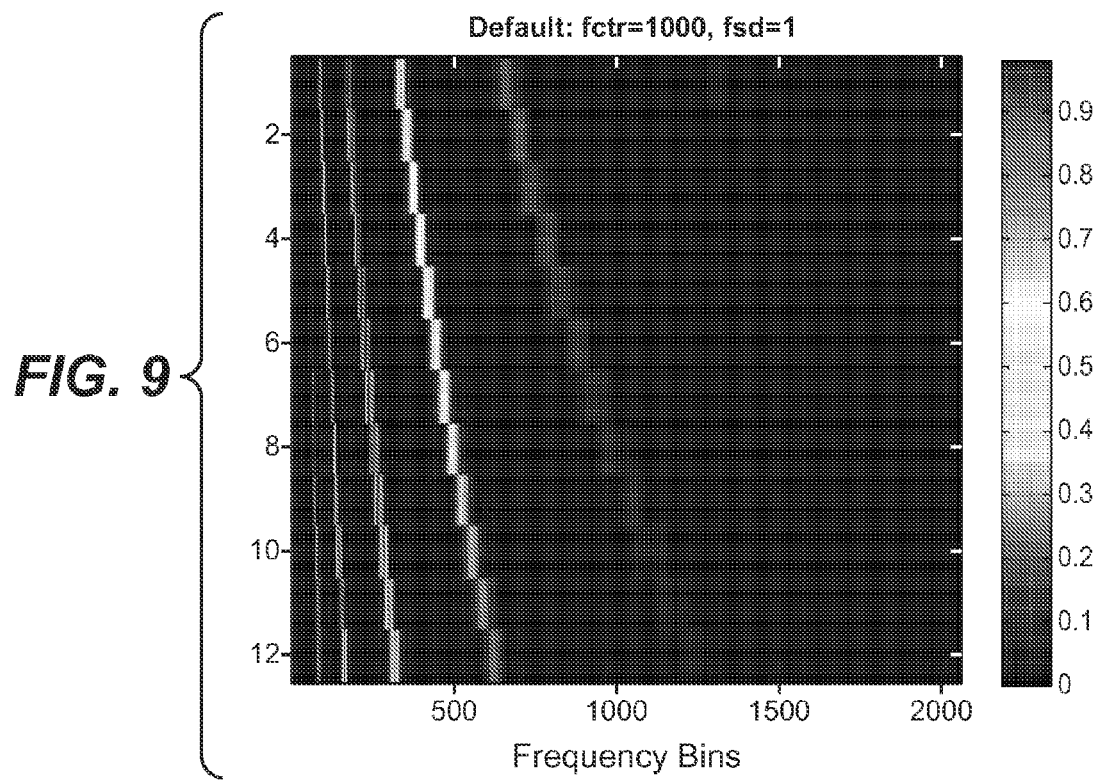
FIG. 9 illustrates a first example weighting matrix relating to a chromagram computed on a restricted frequency range, according to possible embodiments of the present invention.
Figure 10:
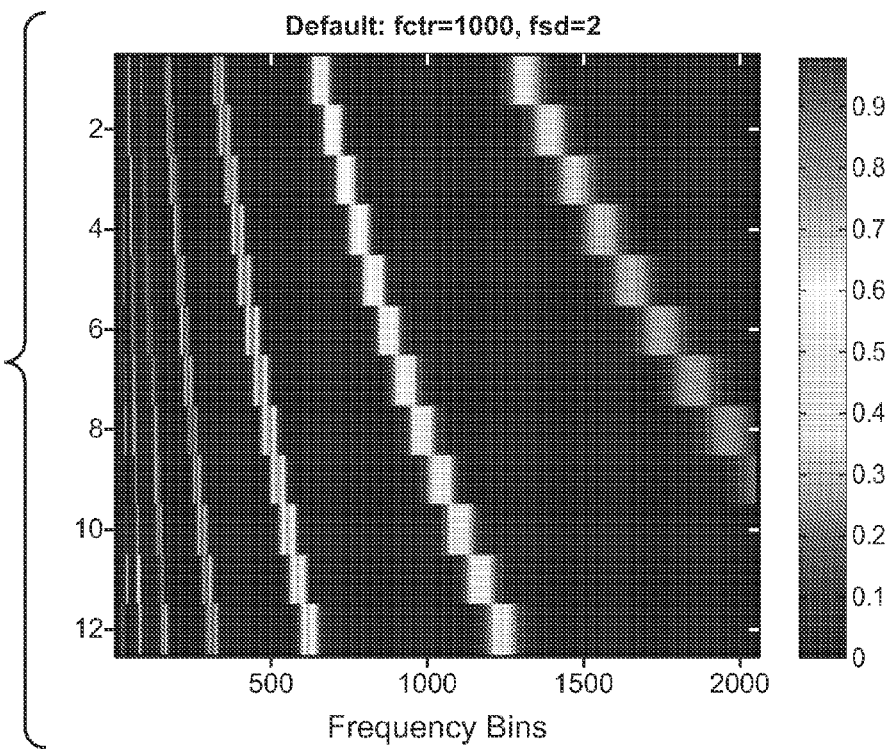
FIG. 10 illustrates a second example weighting matrix relating to a chromagram computed on a restricted frequency range, according to possible embodiments of the present invention.
Figure 11:
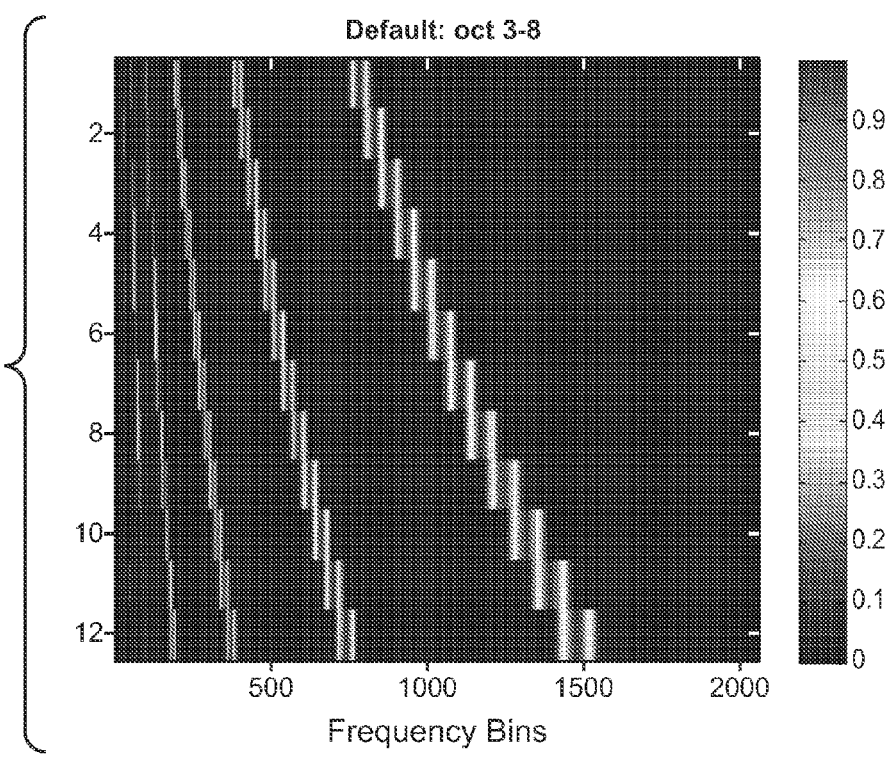
FIG. 11 illustrates a third example weighting matrix relating to a chromagram computed on a restricted frequency range, according to possible embodiments of the present invention.

Thus, in these embodiments, the chromagram herein may be computed on a rather restricted frequency range. This can be seen from the plots of a corresponding weighting matrix as illustrated in FIG. 9. If the f_sd of the Gaussian weighting is increased to 2 in units of octaves, the spread of the weighting for the Gaussian weighting is also increased. The plot of a corresponding weighting matrix looks as shown in FIG. 10. As a comparison, the weighting matrix looks as shown in FIG. 11 when operating with an f_sd having a value of 3 to 8 octaves.

Figure 12:
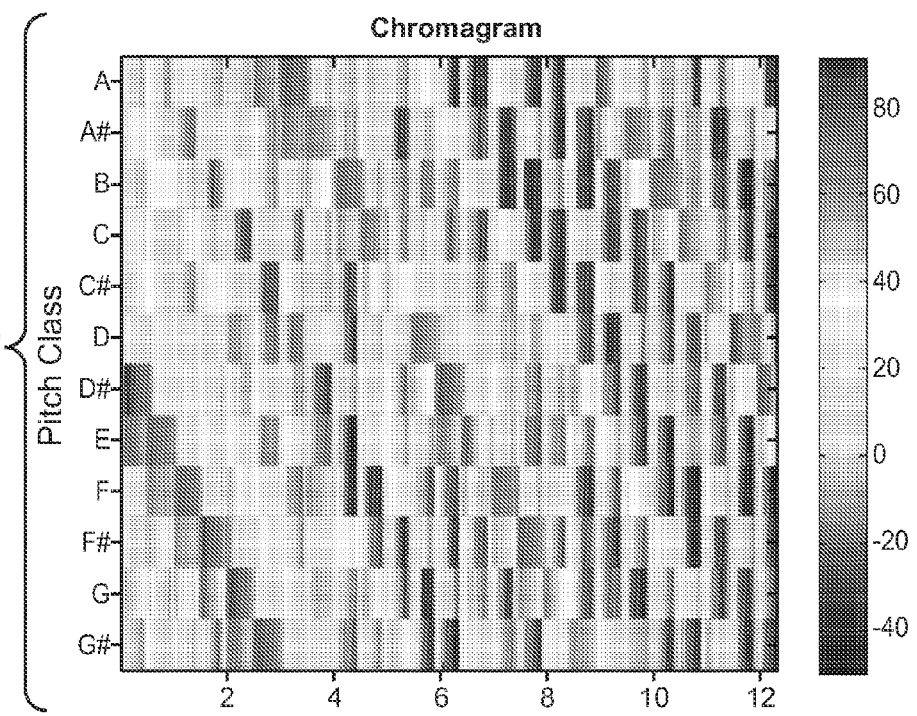
FIG. 12 illustrates an example chromagram plot associated with example media data in the form of a piano signal (with musical notes of gradually increasing octaves) using a perceptually motivated BPF, according to possible embodiments of the present invention.
Figure 13:
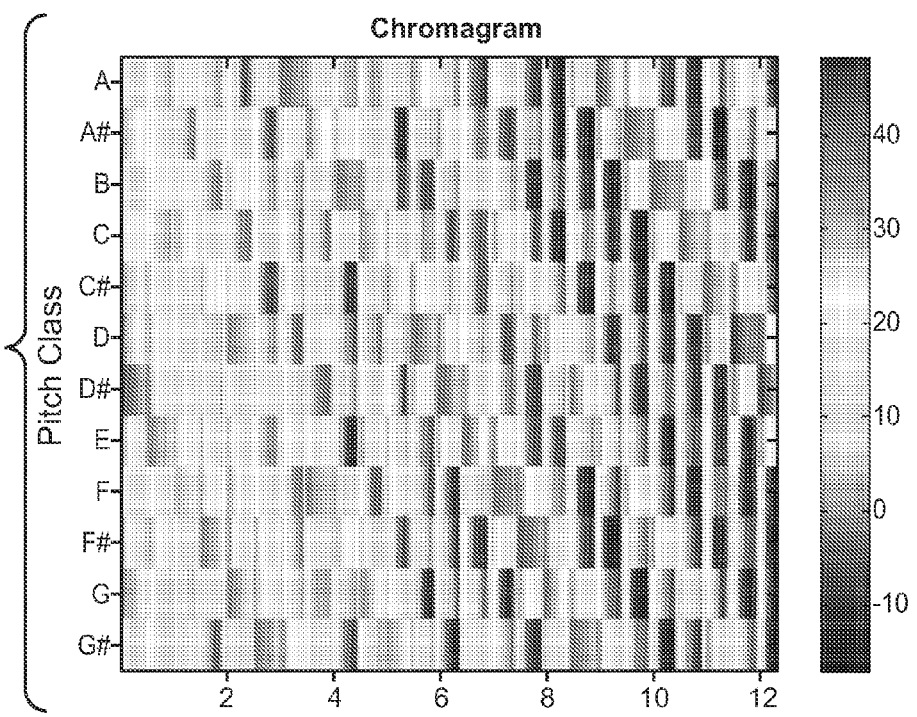
FIG. 13 illustrates an example chromagram plot associated with the piano signal as shown in FIG. 12 but using the Gaussian weighting, according to possible embodiments of the present invention.

FIG. 12 illustrates an example chromagram plot associated with example media data in the form of a piano signal (with musical notes of gradually increasing octaves) using a perceptually motivated BPF. In comparison, FIG. 13 illustrates an example chromagram plot associates with the same piano signal using the Gaussian weighting. The framing and shift is chosen to be exactly same for the purposes of making comparison between the two chromagram plots.

The patterns in both chromagram plots look similar. A perceptually motivated band-pass filter may provide better energy concentration and separation. This is visible for the lower notes, where the notes in the chromagram plot generated by the Gaussian weighting look hazier. While the different BPFs may impact chord recognition applications differently, a perceptually motivated filter brings little added benefits for segment (e.g., chorus) extraction.

In some possible embodiments, the chromagram and fingerprint extraction as described herein may operate on media data in the form of a 16-kHz sampled audio signal. Chromagram may be computed with STFT with a 3200-sample Hann window using FFT. A FFT frame may be shifted by 800 samples with a discrete time step (e.g., 1 frame shift) of 50 ms.

It should be noted that other sampled audio signals may be processed by techniques herein. Furthermore, for the purpose of the present invention, a chromagram computed with a different transform, a different filter, a different window function, a different number of samples, a different frame shift, etc. is also within the scope of the present invention.

5. OTHER FEATURES

Techniques herein may use various features that are extracted from the media data such as MFCC, rhythm features, and energy described in this section. As previously noted, some, or all, of extracted features as described herein may also be applied to scene change detection. Additionally and/or optionally, some, or all, of these features may also be used by the ranking component as described herein.

5.1 Mel-Frequency Cepstral Coefficients (MFCC)

Mel-frequency Cepstral coefficients (MFCCs) aim at providing a compact representation of the spectral envelope of an audio signal. The MFCC features may provide a good description of the timbre and may also be used in musical applications of the techniques as described herein.

5.2 Rhythm Features

Some algorithmic details of computing the rhythmic features may be found in Hollosi, D., Biswas, A., "Complexity Scalable Perceptual Tempo Estimation from HE-AAC Encoded Music," in 128$^{th}$ AES Convention, London, UK, 22-25 May 2010, the entire contents of which is hereby incorporated by reference as if fully set forth herein. In some possible embodiments, perceptual tempo estimation from HE-AAC encoded music may be carried out based on modulation frequency. Techniques herein may include a perceptual tempo correction stage in which rhythmic features are used to correct octave errors. An example procedure for computing the rhythmic features may be described as follows.

In the first step, a power spectrum is calculated; a Mel-Scale transformation is then performed. This step accounts for the non-linear frequency perception of the human auditory system while reducing the number of spectral values to only a few Mel-Bands. Further reduction of the number of bands is achieved by applying a non-linear companding function, such that higher Mel-bands are mapped into single bands under the assumption that most of the rhythm information in the music signal is located in lower frequency regions. This step shares the Mel filter-bank used in the MFCC computation.

In the second step, a modulation spectrum is computed. This step extracts rhythm information from media data as described herein. The rhythm may be indicated by peaks at certain modulation frequencies in the modulation spectrum. In an example embodiment, to compute the modulation spectrum, the companded Mel power spectra may be segmented into time-wise chunks of 6 s length with certain overlap over the time axis. The length of the time-wise chunks may be chosen from a trade-off between costs and benefits involving computational complexity to capture the "long-time rhythmic characteristics" of an audio signal. Subsequently, an FFT may be applied along the time-axis to obtain a joint-frequency (modulation spectrum: x-axis—modulation frequency and y-axis—companded Mel-bands) representation for each 6 s chunk. By weighting the modulation spectrum along the modulation frequency axis with a perceptual weighting function obtained from analysis of large music datasets, very high and very low modulation frequencies may be suppressed (such that meaningful values for the perceptual tempo correction stage may be selected).

In the third step, the rhythmic features may then be extracted from the modulation spectrum. The rhythmic features that may be beneficial for scene-change detection are: rhythm strength, rhythm regularity, and bass-ness. Rhythm strength may be defined as the maximum of the modulation spectrum after summation over companded Mel-bands. Rhythm regularity may be defined as the mean of the modulation spectrum after normalization to one. Bass-ness may be defined as the sum of the values in the two lowest companded Mel-bands with a modulation frequency higher than one (1) Hz.

6. DETECTION OF REPETITIVE PARTS

Figure 14:
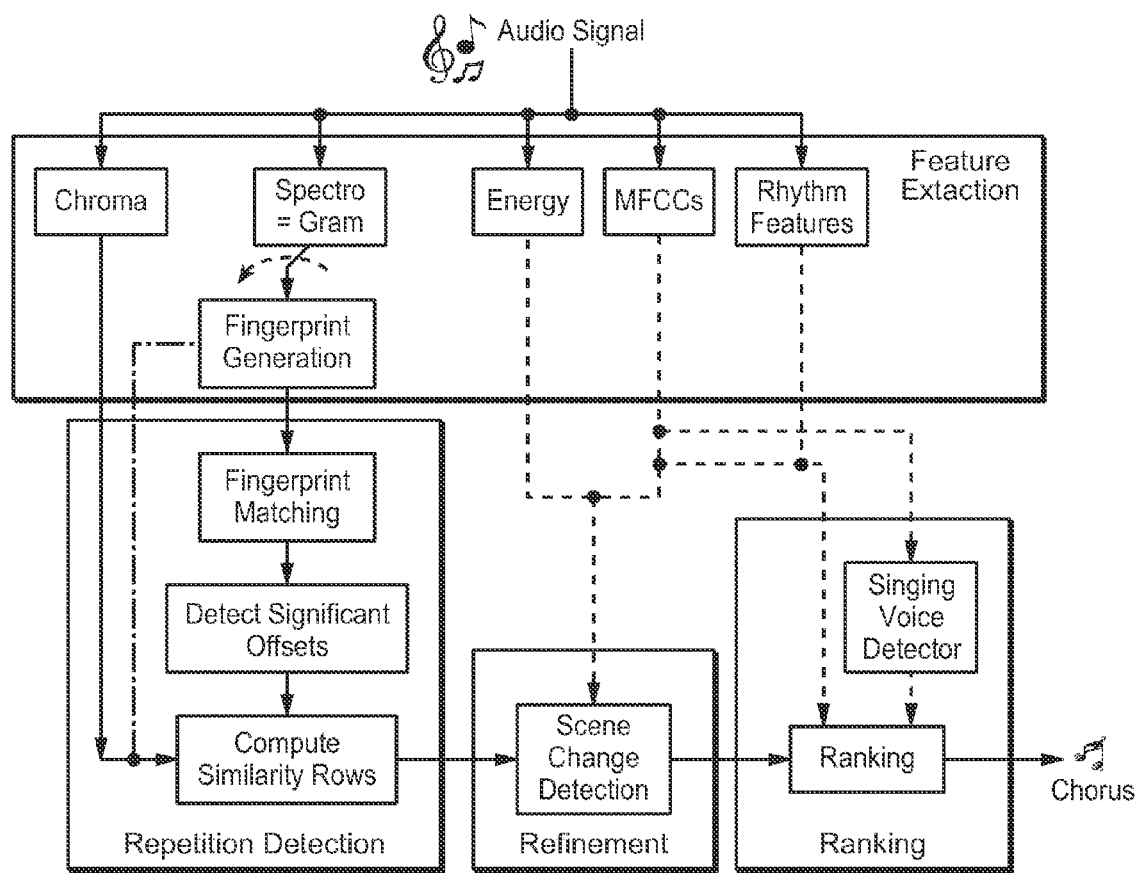
FIG. 14 illustrates an example detailed block diagram of a media processing system, according to possible embodiments of the present invention.
Figure 15:
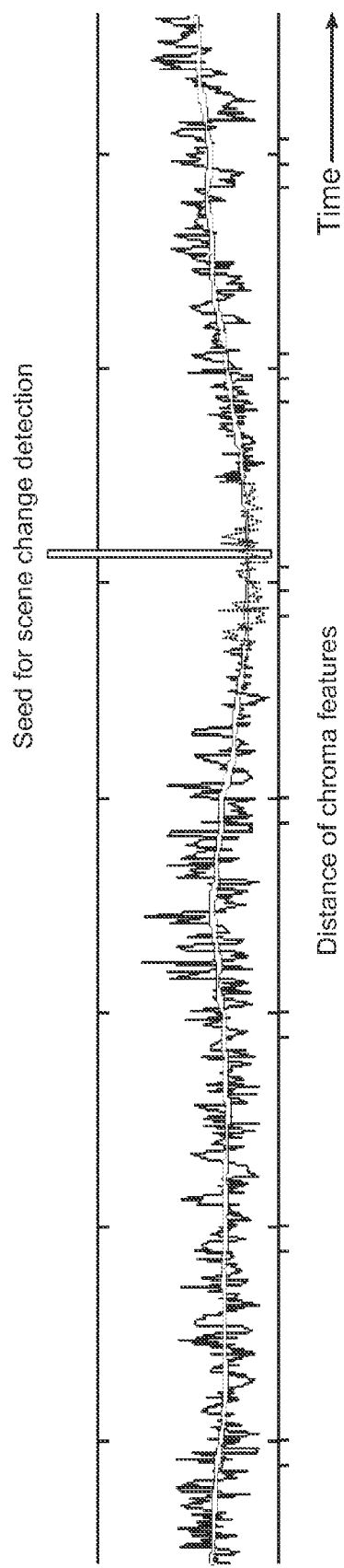
FIG. 15 illustrates example chroma distance values for a row of a similarity matrix, smoothed distance values and resulting seed time point for scene change detection, according to possible embodiments of the present invention.

In some possible embodiments, repetition detection (or detection of repetitive parts) as described herein may be based on both fingerprints and chroma features. FIG. 14 depicts an example detailed block diagram of the system. FIG. 15 shows example chroma distance values for a row of the similarity matrix, the smoothed distance and the resulting seed point for the scene change detection.

7. REFINEMENT USING SCENE CHANGE DETECTION

In some possible embodiments, a position in media data such as a song, after having been identified by a feature distance analysis such as a chroma distance analysis as the most likely inside a candidate representative segment with certain media characteristics may be used as a seed time point for scene change detection. Examples of media characteristics for the candidate representative segment may be repetition characteristics possessed by the candidate representative segment in order for the segment to be considered as a candidate for the chorus of the song; the repetition characteristics, for example, may be determined by the selective computations of the distance matrix as described above.

In some possible embodiments, the scene change detection block of FIG. 14 may be configured in a system herein to identify two scene changes (e.g., in audio) in the vicinity of the seed time point:

a beginning scene change point to the left of the seed time point corresponding to the beginning of the representative segment;

an ending scene change point to the right of the seed time point corresponding to the end of the representative segment.

Figure 16:
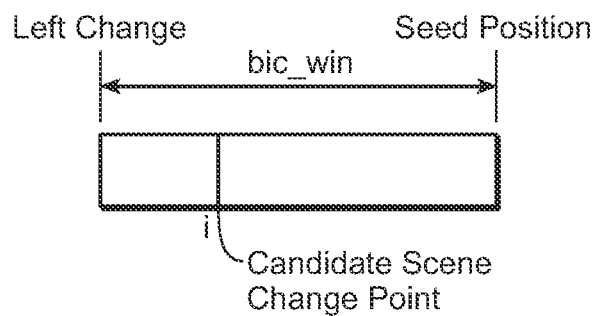
FIG. 16 illustrates an example candidate window for scene change detection, according to possible embodiments of the present invention.

In some possible embodiments, scene change detection is performed on audio data in the media data. In order to detect the beginning scene change point to the left of the seed time point, a window of "bic_win" seconds of audio data in the media data, which ends at the seed time point, may be considered as a candidate window as shown in FIG. 16. In some possible embodiments, "bic_win" may be set to 20 s, 30 s, 40 s, 50 s, etc. In some possible embodiments, it may be assumed that the beginning scene change point is within this candidate window. More specifically, a sequence of N feature vectors $\{x_1, x_2, \ldots x_N\}$ may be identified within the candidate window. At each candidate scene change point within this sequence, one of the following two hypotheses may be chosen:

$H_0$: $\{x_1, x_2, \ldots x_N\} \sim N(\text{mu},\text{sigma})$ $H_1$: $\{x_1, x_2, \ldots x_i\} \sim N(\text{mu}_1,\text{sigma}_1)$ and $\{x_{i+1}, x_{i+2}, \ldots x_N\} \sim N(\text{mu}_2,\text{sigma}_2)$ $H_0$ represents the hypothesis that there is no scene change within this window and all feature vectors can be explained by a single multivariate distribution (e.g., a Gaussian distribution) with distribution parameters (e.g., mean "mu" and covariance "sigma"). $H_1$ represents the hypothesis that there is a scene change at the index "i" and the features from 1 to i can be explained by a first multivariate distribution with first distribution parameters (e.g., $mu_1$ and $sigma_1$ for a first Gaussian distribution), while the features from i+1 to N can be explained by a second different multivariate distribution with second different distribution parameters (e.g., $mu_2$ and $sigma_2$ for a second different Gaussian distribution). In some possible embodiments, in order to select one of the two hypotheses, a Bayesian Information Criterion (BIC) may be used. The BIC for $H_0$ may be computed as below:

$$BIC(H_0, \{x_1, x_2, \ldots, x_N\}) = \log P(\{x_1, x_2, \ldots, x_N\}/N(mu, sigma)) - 0.5 * lambda * \#(H_0) * \log(N)$$

Here the first term on the right represents the logarithmic likelihood of the data under $H_0$ and the second term represents the model complexity (in terms of number of parameters) and lambda is the tradeoff parameter between model complexity and likelihood and may be chosen as 1 in some possible embodiments.

Similarly, the BIC for $H_1$ can be written as below:

$$BIC(H_1, \{x_1, x_2, \ldots x_N\}) = \log P(\{x_1, x_2, \ldots x_N\}/N(mu_1, sigma_1), N(mu_2, sigma_2)) - 0.5 * lambda * \#(H_1) * \log(N)$$

A difference value may be computed as follows:

$$deltaBIC(i) = BIC(H_1, \{x_1, x_2, \ldots x_N\}) - BIC(H_0, \{x_1, x_2, \ldots x_N\})$$

Figure 17A:
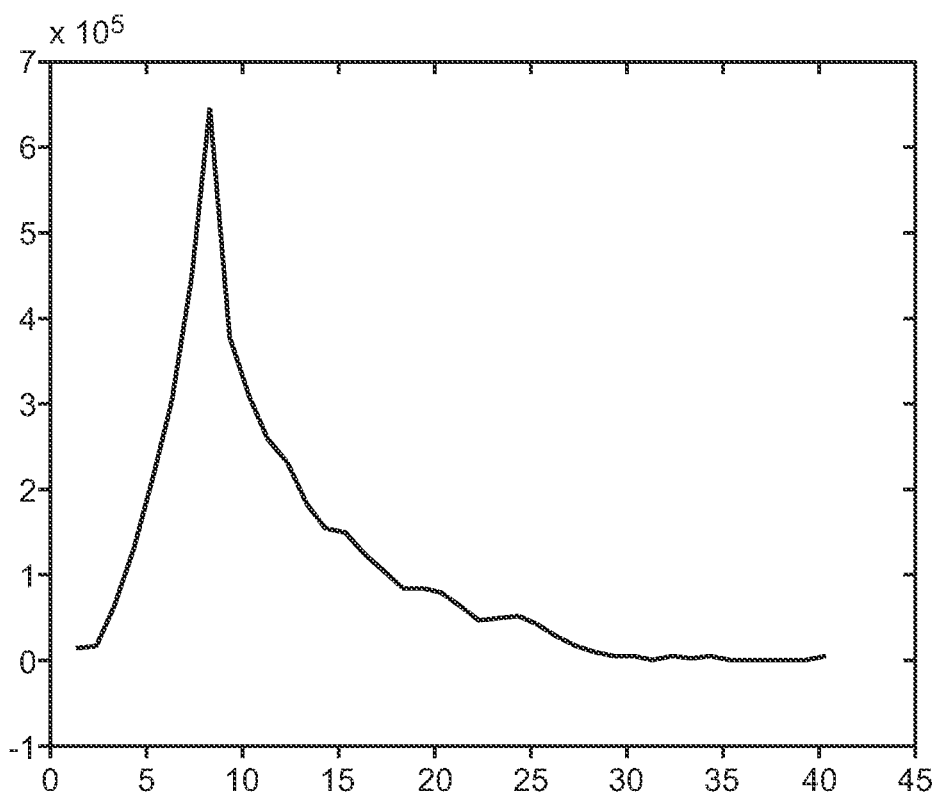
FIG. 17A illustrates an example statistical pattern change for scene change point, according to possible embodiments of the present invention.
Figure 17B:
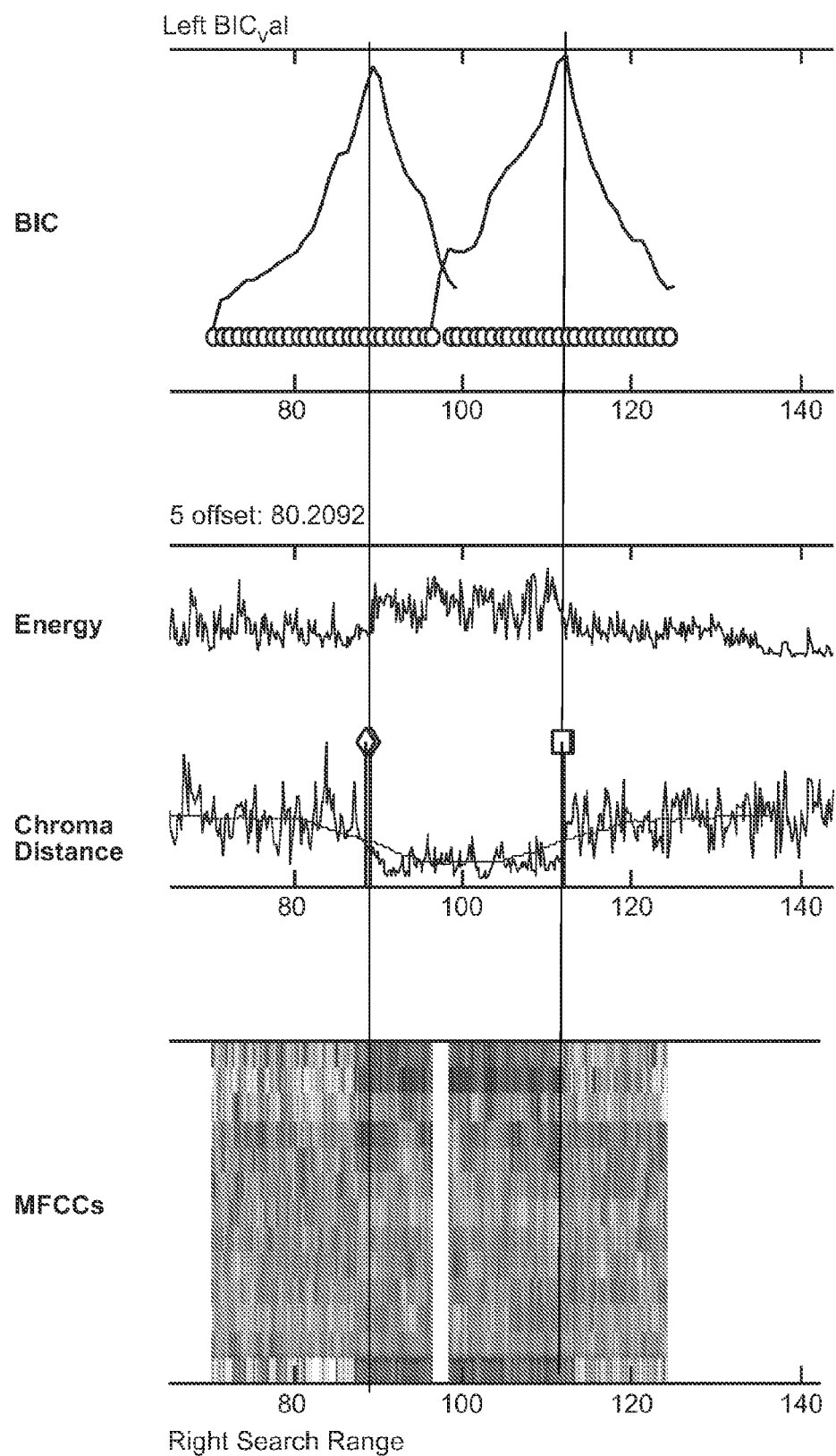
FIG. 17B shows an example detecting a scene change point using multiple features, according to possible embodiments of the present invention.

At every candidate scene change point, it may be evaluated as to how much $H_1$ is the better model than $H_0$ or vice versa. The candidate scene change point at which deltaBIC is maximum may be declared as the identified point of scene change point. FIG. 17A shows an example value of deltaBIC at each candidate scene change point. In this example, deltaBIC has a peak at the true scene change point. In this example, deltaBIC has a peak at the true scene change point. FIG. 20B shows an example detecting a scene change point using multiple features.

The scene change detection procedure as described herein may be repeated to the right of the seed time point as well to detect the ending scene change point of the candidate representative segment. Additionally and/or optionally, the scene change detection procedure as described herein may be repeated with one or more different types of one or multidimensional features within the window. The results from applying the scene change detection procedure to various features may be combined. In some possible embodiments, features relating to structural properties, tonality including harmony and melody, timbre, rhythm, loudness, stereo mix, or a quantity of sound sources of the media data to perform the BIC based scene change detection.

8. RANKING

The ranking component of FIG. 14 may be given several candidate representative segments for possessing certain media characteristics (e.g., the chorus) as input signals and may select one of the candidate representative segments as the output of the signal, regarded as the representative segment (e.g., a detected chorus section). All candidates representative segments may be defined or delimited by their beginning and ending scene change points (e.g., as a result from the scene change detection described herein).

9. OTHER APPLICATIONS

Techniques as described herein may be used to detect chorus segments from music files. However, in general the techniques as described herein are useful in detecting any repeating segment in any audio file.

10. EXAMPLE PROCESS FLOW

Figure 18:
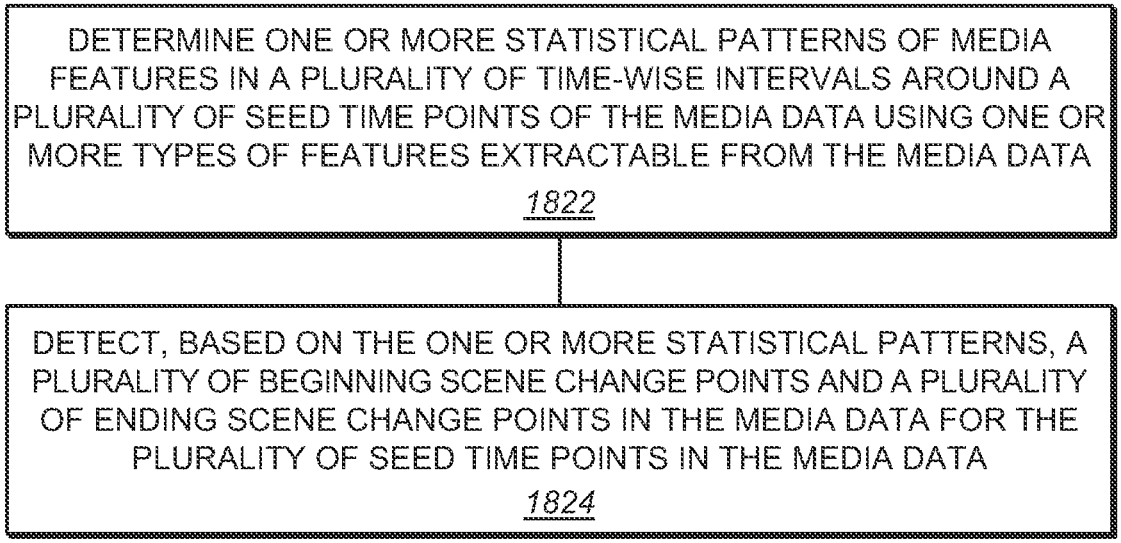
FIG. 18 illustrates an example process flow according to possible embodiments of the present invention.

FIG. 18 illustrates an example scene detection process flow according to possible embodiments of the present invention. In some possible embodiments, one or more computing devices or components in a media processing system may perform this process flow. In block 1822, a media processing system determines one or more statistical patterns of media features in a plurality of time intervals around a plurality of seed time points of the media data using one or more types of features extractable from the media data. At least one of the one or more types of features may comprise a type of features that captures structural properties, tonality including harmony and melody, timbre, rhythm, loudness, stereo mix, or a quantity of sound sources as related to the media data.

In block 1824, the media processing system detects, based on the one or more statistical patterns, a plurality of beginning scene change points and a plurality of ending scene change points in the media data for the plurality of seed time points in the media data.

In some possible embodiments, the plurality of seed time points may comprise at least one seed time point located inside a repeating section of the media data. In some possible embodiments, the plurality of seed time points may comprise at least one seed time point located inside a unique section of the media data. In some possible embodiments, at least one seed point in the plurality of seed time points may be chosen based on energy values. For instance, the temporal location of the loudest 15 s segment may serve as a seed time point for chorus segment detection.

In some possible embodiments, the features extractable from the media data comprise one or more features of chroma, chroma difference, fingerprints, Mel-Frequency Cepstral Coefficient (MFCC), chroma-based fingerprints, rhythm pattern, energy, or other variants.

In some possible embodiments, the media processing system further determines, based on one or more pairs of scene change points each individual pair in the one or more pairs being formed by an individual beginning scene change point in the plurality of beginning scene change points and an individual ending scene change point in the plurality of ending scene change points, a plurality of candidate representative segments in the media data.

In some possible embodiments, the plurality of candidate representative segments comprises a candidate representative segment defined or delimited with a pair in the individual pairs of scene change points. In some possible embodiments, the plurality of candidate representative segments comprises a chorus segment. In various possible embodiments, the plurality of candidate representative segments comprises one of: highly repetitive segments (e.g., chorus or verse), frequently repeated segments, intermediately repeated segments, infrequently repeated segments (e.g., unique segments such as an intro, solo section), or other characteristic segments (can be repeating or non-repeating). In a particular embodiment, the plurality of candidate representative segments comprises a unique segment.

In some possible embodiments, the media processing system may apply a model selection criterion to the one or more statistical patterns to detect scene changes in the media data. The model selection criterion may relate to one or more of Gaussian statistical models, or non-Gaussian General statistical models.

In some possible embodiments, the one or more statistical patterns comprises at least a statistical pattern of media features based on one or more of chroma distance, MFCC, spectral contrast, spectral centroid, spectral bandwidth, spectral roll-off, spectral flatness, one or more rhythm patterns, energy, or one or more stereo parameters. Here, the one or more rhythm patterns may comprise one or more of rhythm strength based patterns, rhythm regularity based patterns, and bass-ness based patterns. The one or more stereo parameters may comprise at least one stereo parameter based on one or more of: Inter-Channel Coherence (ICC), Channel Level Difference (CLD), Inter-channel Phase Difference (IPD), Channel Prediction Coefficient (CPC), or Inter-channel Intensity Difference (IID). The IID or ICC may be derived with Channel Prediction Coefficients (CPC). In some possible embodiments, at least one of the one or more stereo parameters with one of parametric stereo encoders (PS) or Moving-Picture-Experts-Group Surround encoder (MPS).

As used herein, the media data bitstreams may comprise one or more of Advanced Audio Coding (AAC) bitstreams, High-Efficiency AAC bitstreams, MPEG-1/2 Audio Layer 3 (MP3) bitstreams, Dolby Digital (AC3) bitstreams, Dolby Digital Plus bitstreams, Dolby Pulse bitstreams, or Dolby TrueHD bitstreams.

In some possible embodiments, at least one of the one or more types of features herein is used in part to form a digital representation of the media data. For example, the digital representation of the media data may comprise a fingerprint-based reduced dimension binary representation of the media data.

In some possible embodiments, at least one of the one or more types of features comprises a type of features that captures structural properties, tonality including harmony and melody, timbre, rhythm, loudness, stereo mix, or a quantity of sound sources as related to the media data.

In some possible embodiments, the features extractable from the media data are used to provide one or more digital representations of the media data based on one or more of: chroma, chroma difference, fingerprints, Mel-Frequency Cepstral Coefficient (MFCC), chroma-based fingerprints, rhythm pattern, energy, or other variants.

In some possible embodiments, the features extractable from the media data are used to provide one or more digital representations relates to one or more of: fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Mirror Filters (QMFs), Complex QMFs (CQMFs), discrete wavelet transforms (DWTs), or wavelet coefficients.

As used herein, the media data may comprise one or more of: songs, music compositions, scores, recordings, poems, audiovisual works, movies, or multimedia presentations. The media data may be derived from one or more of: audio files, media database records, network streaming applications, media applets, media applications, media data bitstreams, media data containers, over-the-air broadcast media signals, storage media, cable signals, or satellite signals.

As used herein, the stereo mix may comprise one or more stereo parameters of the media data. In some possible embodiments, at least one of the one or more stereo parameters relates to: Coherence, Inter-channel Cross-Correlation (ICC), Inter-channel Level Difference (CLD), Inter-channel Phase Difference (IPD), or Channel Prediction Coefficients (CPC).

In some embodiments in which chroma features are used in techniques herein, the chroma features may be extracted using one or more window functions. These window functions may be, but are not limited to: musically motivated, perceptually motivated, etc.

As used herein, the features extractable from the media data may or may not relate to a tuning system of 12 equal temperaments.

11. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 19:
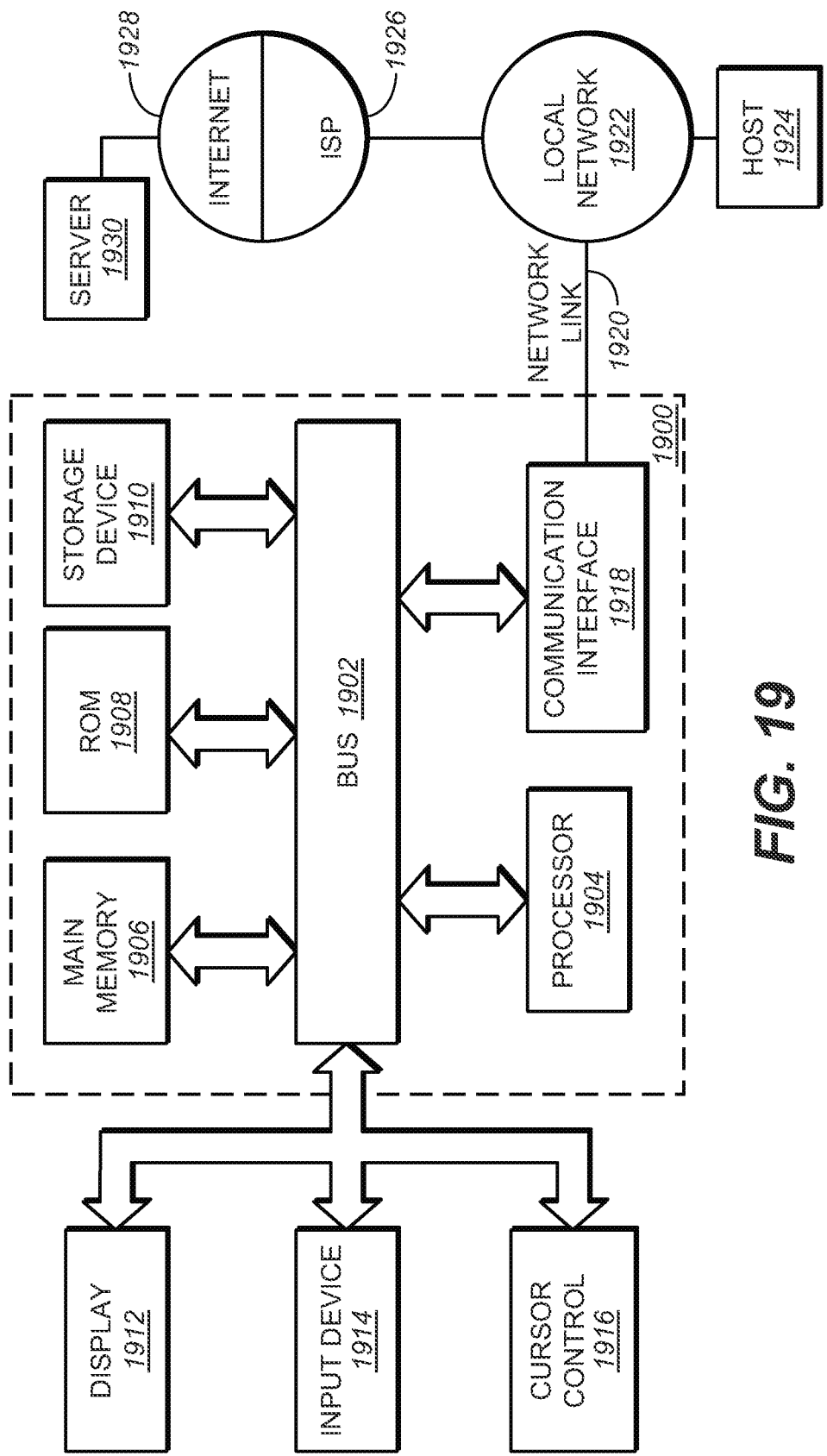
FIG. 19 illustrates an example hardware platform on which a computer or a computing device as described herein may be implemented, according a possible embodiment of the present invention.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912 for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. Computer system 1900 may be used to control the display system (e.g., 100 in FIG. 1).

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. The received code may be executed by processor 1904 as it is received, and/or stored in storage device 1910, or other non-volatile storage for later execution.

12. EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for scene change detection in media data, comprising:
   deriving a set of filtered values from the media data;
   identifying a plurality of seed time points among time points at which the set of filtered values derived from the media data reach extremum values;
   determining one or more statistical patterns of media features in a plurality of time-wise intervals around the plurality of seed time points of the media data using one or more types of features extractable from the media data, at least one of the one or more types of features comprising a type of features that captures structural properties, tonality including harmony and melody, timbre, rhythm, loudness, stereo mix, or a quantity of sound sources as related to the media data;
   detecting, based on the one or more statistical patterns, a plurality of beginning scene change points and a plurality of ending scene change points in the media data for the plurality of seed time points in the media data;
wherein the method is performed by one or more computing devices.

2. The method of claim 1, wherein the plurality of seed time points comprises at least one seed time point located inside a repeating section of the media data.

3. The method of claim 1, wherein the plurality of seed time points comprises at least one seed time point located inside a unique section of the media data.

4. The method of claim 1, wherein the plurality of seed time points comprises at least one seed time point located inside the loudest section of the media data.

5. The method of claim 1, wherein the plurality of seed time points comprises at least one seed time point located inside a section of the media data with the most of number of sound sources.

6. The method of claim 1, wherein the features extractable from the media data comprise one or more features of: chroma, chroma difference, fingerprints, Mel-Frequency Cepstral Coefficient (MFCC), chroma-based fingerprints, rhythm pattern, energy, or other variants.

7. The method of claim 1, further comprising:
determining, based on one or more pairs of scene change points each individual pair in the one or more pairs being formed by an individual beginning scene change point in the plurality of beginning scene change points and an individual ending scene change point in the plurality of ending scene change points, a plurality of candidate representative segments in the media data.

8. The method of claim 7, wherein the plurality of candidate representative segments comprises a candidate representative segment defined or delimited with a pair in the individual pairs of scene change points.

9. The method of claim 7, wherein the plurality of candidate representative segments comprises a certain section of the media data that comprises one of chorus, verse, solo section, bridge section, intro.

10. The method of claim 7, wherein the plurality of candidate representative segments comprises at least one of: highly repetitive segments, frequently repeated segments, intermediately repeated segments, or infrequently repeated segments.

11. The method of claim 7, wherein the plurality of candidate representative segments comprises a unique segment.

12. The method of claim 1, further comprising applying a model selection criterion to the one or more statistical patterns to detect scene changes in the media data.

13. The method of claim 1, wherein the one or more statistical patterns comprises at least a statistical pattern of media features based on one or more of: chroma distance, distance of differential chroma features, loudness dynamics, MFCC, spectral contrast, spectral centroid, spectral bandwidth, spectral roll-off, spectral flatness, one or more rhythm patterns, energy, or one or more stereo parameters.

14. The method of claim 1, wherein at least one of the one or more types of features is used to form in part a digital representation of the media data.

15. The method of claim 1, wherein the features extractable from the media data are used to provide one or more digital representations of the media data based on one or more of: chroma, chroma difference, fingerprints, Mel-Frequency Cepstral Coefficient (MFCC), chroma-based fingerprints, rhythm pattern, energy, or other variants.

16. The method of claim 1, wherein the features extractable from the media data are used to provide one or more digital representations relates to one or more of: fast Fourier transforms (FFTs), digital Fourier transforms (DFTs), short time Fourier transforms (STFTs), Modified Discrete Cosine Transforms (MDCTs), Modified Discrete Sine Transforms (MDSTs), Quadrature Minor Filters (QMFs), Complex QMFs (CQMFs), discrete wavelet transforms (DWTs), or wavelet coefficients.

17. The method of claim 1, wherein the media data comprises one or more of: songs, music compositions, scores, recordings, poems, audiovisual works, movies, or multimedia presentations.

18. The method of claim 1, further comprising deriving the media data from one or more of: audio files, media database records, network streaming applications, media applets, media applications, media data bitstreams, media data containers, over-the-air broadcast media signals, storage media, cable signals, or satellite signals.

19. The method of claim 18, wherein the media data bitstreams comprise one or more of: Advanced Audio Coding (AAC) bitstreams, High-Efficiency AAC bitstreams, MPEG-1/2 Audio Layer 3 (MP3) bitstreams, Dolby Digital (AC3) bitstreams, Dolby Digital Plus bitstreams, Dolby Pulse bitstreams, or Dolby TrueHD bitstreams.

20. A non-transitory computer readable storage medium, comprising a set of instructions, which when executed by a processing or computing device cause, control or program the device to execute or perform a process, wherein the process comprises the steps of:
deriving a set of filtered values from media data;
identifying a plurality of seed time points among time points at which the set of filtered values derived from the media data reach extremum values;
determining one or more statistical patterns of media features in a plurality of time-wise intervals around the plurality of seed time points of the media data using one or more types of features extractable from the media data, at least one of the one or more types of features comprising a type of features that captures structural properties, tonality including harmony and melody, timbre, rhythm, loudness, stereo mix, or a quantity of sound sources as related to the media data;
detecting, based on the one or more statistical patterns, a plurality of beginning scene change points and a plurality of ending scene change points in the media data for the plurality of seed time points in the media data.

* * * * *